United States Patent
O'Hare

[11] 3,762,393
[45] Oct. 2, 1973

[54] HAND WARMER BATTERY HEATER

[76] Inventor: Louis Richard O'Hare, 2700 Indianna, N.E., Albuquerque, N. Mex.

[22] Filed: Jan. 3, 1972

[21] Appl. No.: 215,017

[52] U.S. Cl. .......................... 126/263, 126/271.2 R
[51] Int. Cl. ............................................... F23c 5/00
[58] Field of Search.................... 126/208, 265, 266, 126/271.1, 271.2 R, 263; 136/161

[56] References Cited
UNITED STATES PATENTS
2,042,690   6/1936   Weber ................................. 126/263
3,156,813   11/1964   Trainor ............................. 136/161 X Primary Examiner—Meyer Perlin
Assistant Examiner—Ronald C. Capossela

[57] ABSTRACT

An automobile electric battery heater is disclosed using a hand warmer of the glowing carbon or glowing wick with hydrocarbon fuel in which the heat from the hand warmer is transferred to the electric battery by means of a thermally conductive metalic plate placed in contact with both the hand warmer and the battery and in which loss of heat is retarded by both fibrous insulation of the heater, the plate and the battery as well as by a radiation reflecting metalic box which serves to support the heater on said battery and to contain said conductive plate, heater and insulation.

1 Claim, 3 Drawing Figures

PATENTED OCT 2 1973 3,762,393

INVENTOR.
Louis Richard O'Hare

HAND WARMER BATTERY HEATER

This invention relates to any number of heating devices used on electric automotive batteries to prevent the excessive lowering of the temperature of these batteries in cold climate and thereby to prevent the inefficient functioning of these batteries when the efficiency could be reduced by lowering of their temperature.

An object of this invention is the utilization of various types of hand warmer type heaters such as glowing wick, benzene fueled heaters or glowing charcoal or small catalytic heaters to provide heat to keep a battery warm.

Another object of this invention is the efficient utilization of heat from a hand warmer type heater by prevention of heat loss to other than to the battery to be heated by means of insulation such as fibrous insulation to prevent heat loss by connection and conduction and by radiation loss prevention by means of radiation reflective surfaces.

Another object of this invention is the effective conduction and distribution of the heat from the hand warmer type heater to an adequate surface area on the battery to achieve adequate heat transfer to the battery by means of a conduction transfer plate.

Other objects of my invention will become apparent from the discription which follows with the specification.

What I have invented is an automobile battery warmer which is powered by a hand warmer type of heater in which means are employed to securely mount the hand warmer on a metal plate of good heat conducting qualities. The purpose of this plate is to conduct the heat from the hand warmer to the battery, then to distribute this heat over a large surface area of the battery usually on one side of the battery and by so conducting this heat and diffusing it over this wide area to prevent an excessive temperature at any small area on the surface of the battery. Further in my invention means are provided to thermally insulate from radiation, conduction and connection both the hand warmer type heater and the conducting and diffusing plate to reduce heat flow to everything except the battery as well as to help insulate the battery. Finally, in my invention means are employed of securing the heater to the battery by connectors which find the conduction plate with attached heater to the metalic box shaped radiation insulator which encloses the same conduction plate with attached heater and also by means a strap attached to the outside of the same box-shaped radiation insulator which strap encircles the battery and tightens about it to draw the heated side of the heater against a surface of the battery.

The functioning and relative placement of the component parts will become more apparent from the following description of a preferred embodiment thereof, reference being made to the accompaning drawings in which.

Figure 1:
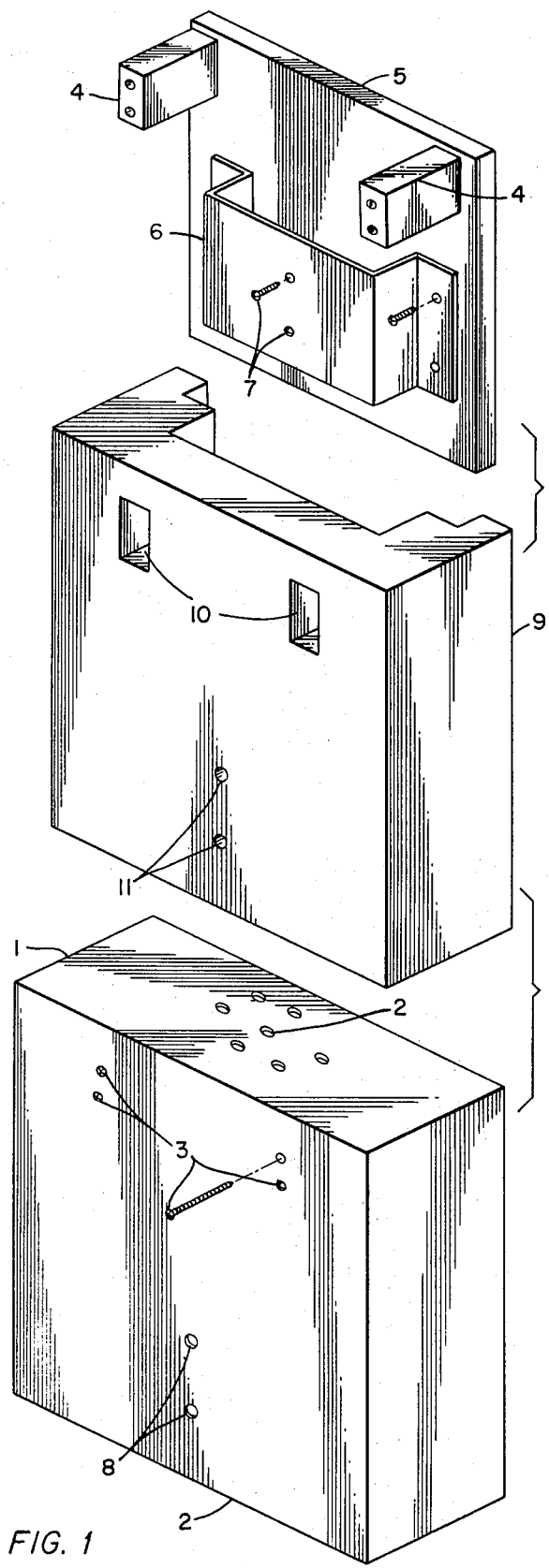
FIG. 1 is a three dimensional view of essential components placed side by side.

Referring now to the drawings and the component parts comprising the invention in FIG. 1, the radiation-reflecting metalic box one is open on its side away from the viewer and has air curculation holes 2 on the top as well as the bottom. The screw holes 3 secure box 1 to the heat insulating standoff support blocks 4 whose function it is to physically support heat diffusing and conducting plate 5 which in turn supports bracket 6.

The purpose of bracket 6 is to firmly support but not tightly enclose the hand warmer type heater. It does this by means of screws and threading 7 forcing hand warmer heater tightly against the back conducting plate 5 in such a way that air can circulate upwards between the bracket and the hand warmer type heater (not shown). Since this bracket 6 is of heat conducting material it also serves to transmit some of the heat from the warmer back to the conduction plate 5. Holes 8 in outer box admit a screwdriver for tightening screws 7. Fibrous insulation block 9 fits into box 1 and encloses plate 5 with bracket 6 and connector blocks 4. Rectangular cavities 10 as well as holes 11 admit connector blocks 4 and screwdriver for tightening screws 7 respectively. The length of connector blocks 4 as well as the thickness of insulation material 9 are such as to allow plate 5 to project out slightly beyond the plane of the far side of box 1 and thereby to fit flat against the flat side of an automobile electric battery when box 1 is bound to the battery with a suitable flexible strap and binder.

Figure 2:
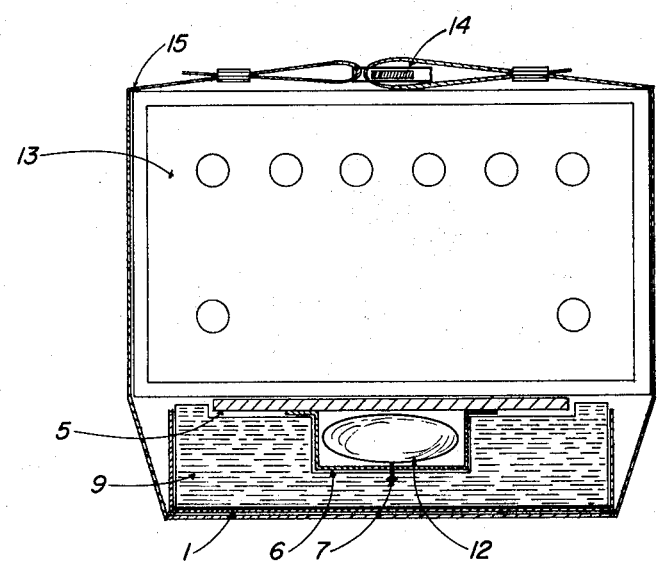
FIG. 2 is a cross sectional view showing interrelation of components as would appear when observing battery and heater from above.

Referring now to FIG. 2 of the drawings and a cross sectional view looking downward from the top of the battery, the box termed the radiation reflector is and numbered 1 in FIG. 1 is again designated by 1. The fibrous insulation material is again shown by the number 9. Hand warmer holding bracket 6 with screw to tighten it 7 are shown holding the oval shaped hand warmer 12. The heater is held to the battery 13 by belt 15 which is tightened by any conventional buckle 14.

Figure 3:
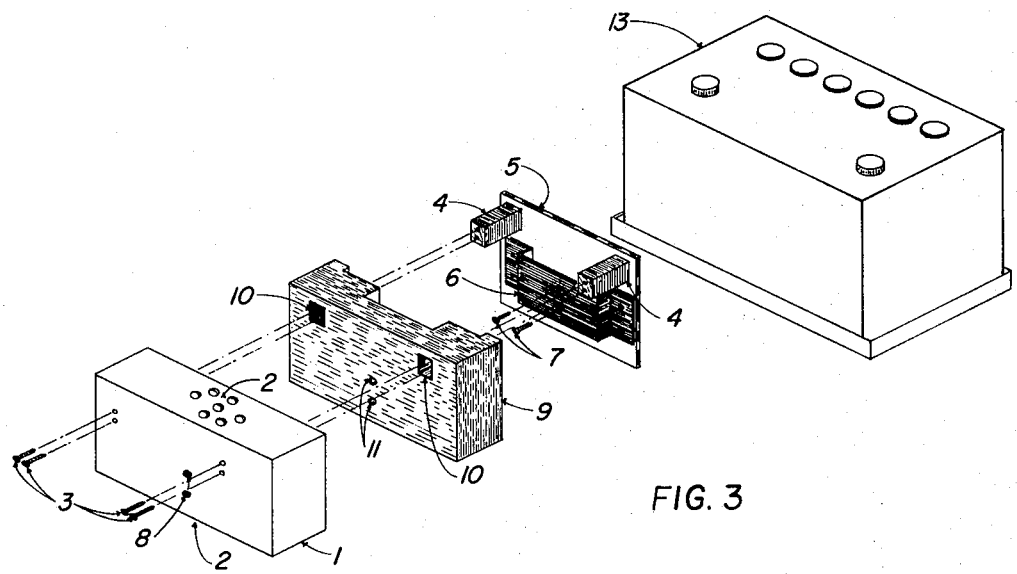
FIG. 3 is a small rectangular box made of metal and holding a piece of glowing charcoal or carbon.

Referring to FIG. 3 the small metalic box open on the top and having holes in the bottom for air may be inserted in bracket 6 in place of hand warmer heater when it contains a piece of glowing charcoal. The box is 16 with holes 17.

What I claim is:

1. A battery heater which comprises:
   a. a small flameless combustion type heater that uses a wick of fibrous material made to glow with flameless combustion when ignited and fueled with a hydrocarbon fuel,
   b. heat diffusing and transferring means conducting high temperatures of the heater to a wide area on the side of the battery by use of a heat conducting metallic plate,
   c. flameless combustion heater support means including a heat conducting metallic support bracket and screws which bind said bracket to heat diffusing plate and screws which by means of threading in said bracket compress the warmer against the plate on the side of the plate opposite the battery
   d. insulation and convection means including fibrous insulation material which covers said bracket and covers the heat diffusing plate of the side opposite the battery said insulation containing breather holes under and over the flameless combustion heater permitting limited air entry and exhausting, and including a polished metallic radiant heat reflecting box enclosing fibrous insulation and heat diffusing plate said box also containing air diffusion holes and screw support holes
   e. insulating material blocks provided with screw holes and threading to support box to plate
   f. final support means including a strap and buckle compressing box and enclosed heating means to the battery.

* * * * *